July 4, 1950 R. R. HUNDLEY 2,513,647
TAPING MEANS FOR CARTON FOLDERS
Filed June 28, 1948 10 Sheets-Sheet 3
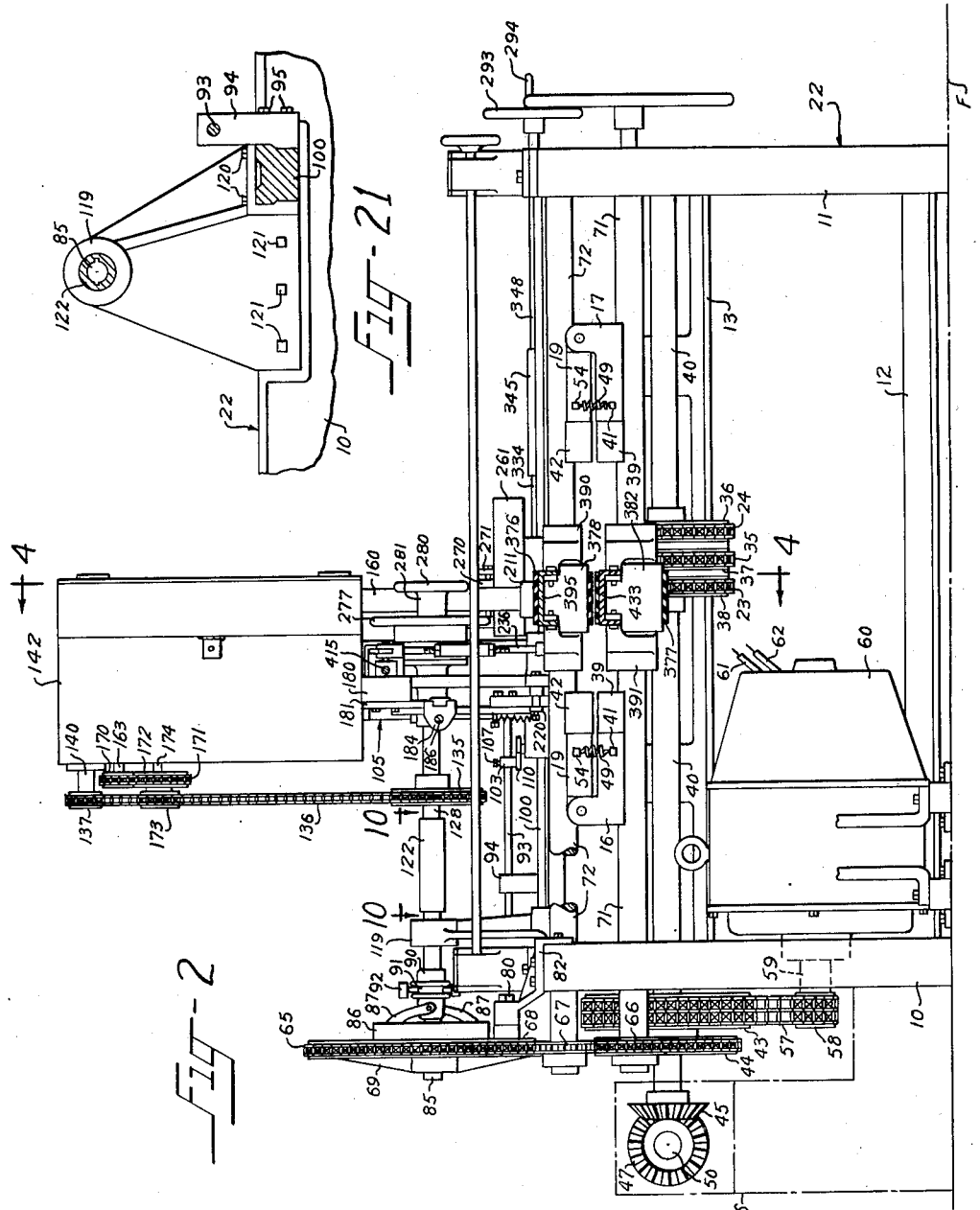
Robert R. Hundley,
Inventor
By Paul Eaton
Attorney July 4, 1950  R. R. HUNDLEY  2,513,647
TAPING MEANS FOR CARTON FOLDERS
Filed June 28, 1948  10 Sheets-Sheet 4
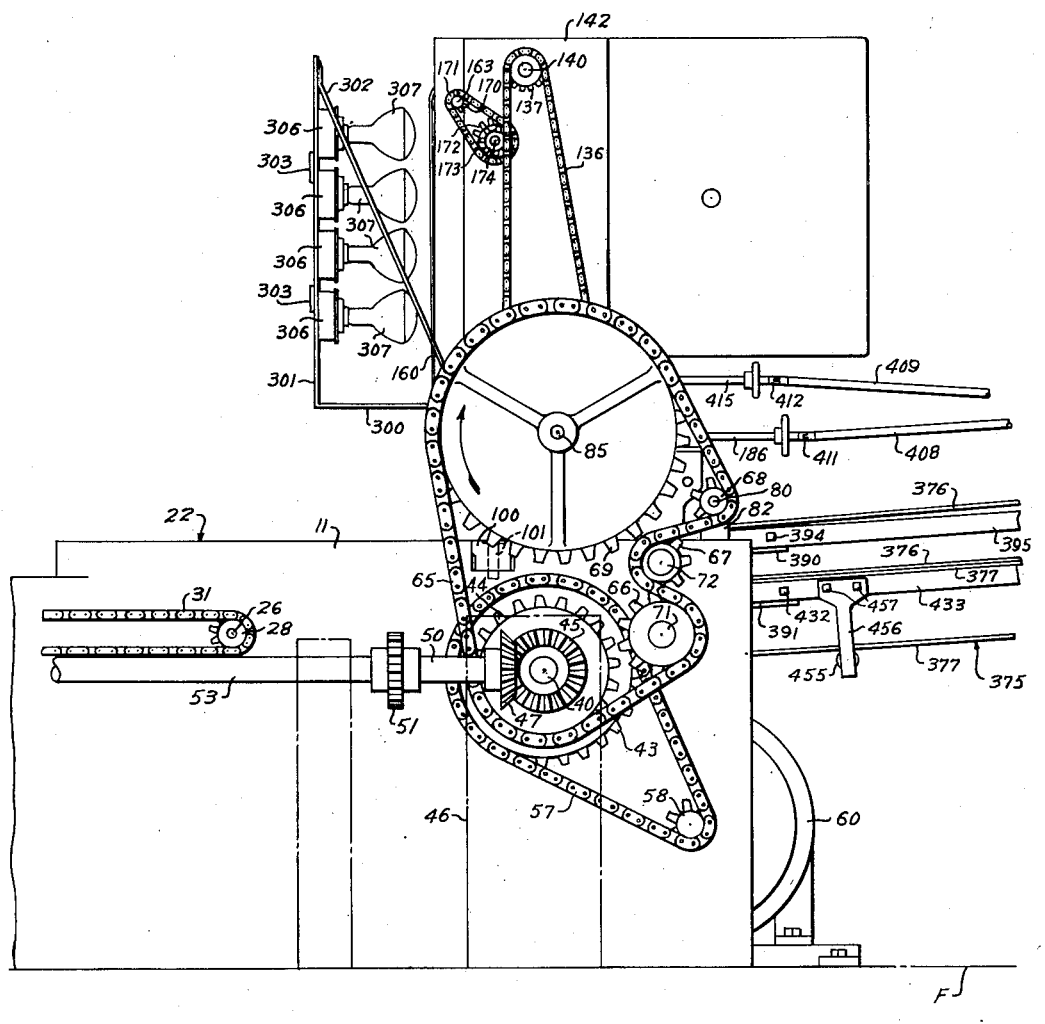
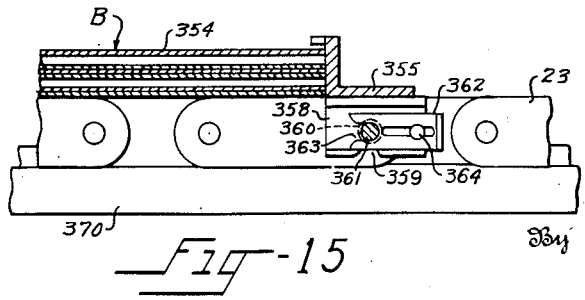
Robert R. Hundley,
Inventor
By
Attorney July 4, 1950 R. R. HUNDLEY 2,513,647
TAPING MEANS FOR CARTON FOLDERS
Filed June 28, 1948 10 Sheets-Sheet 5

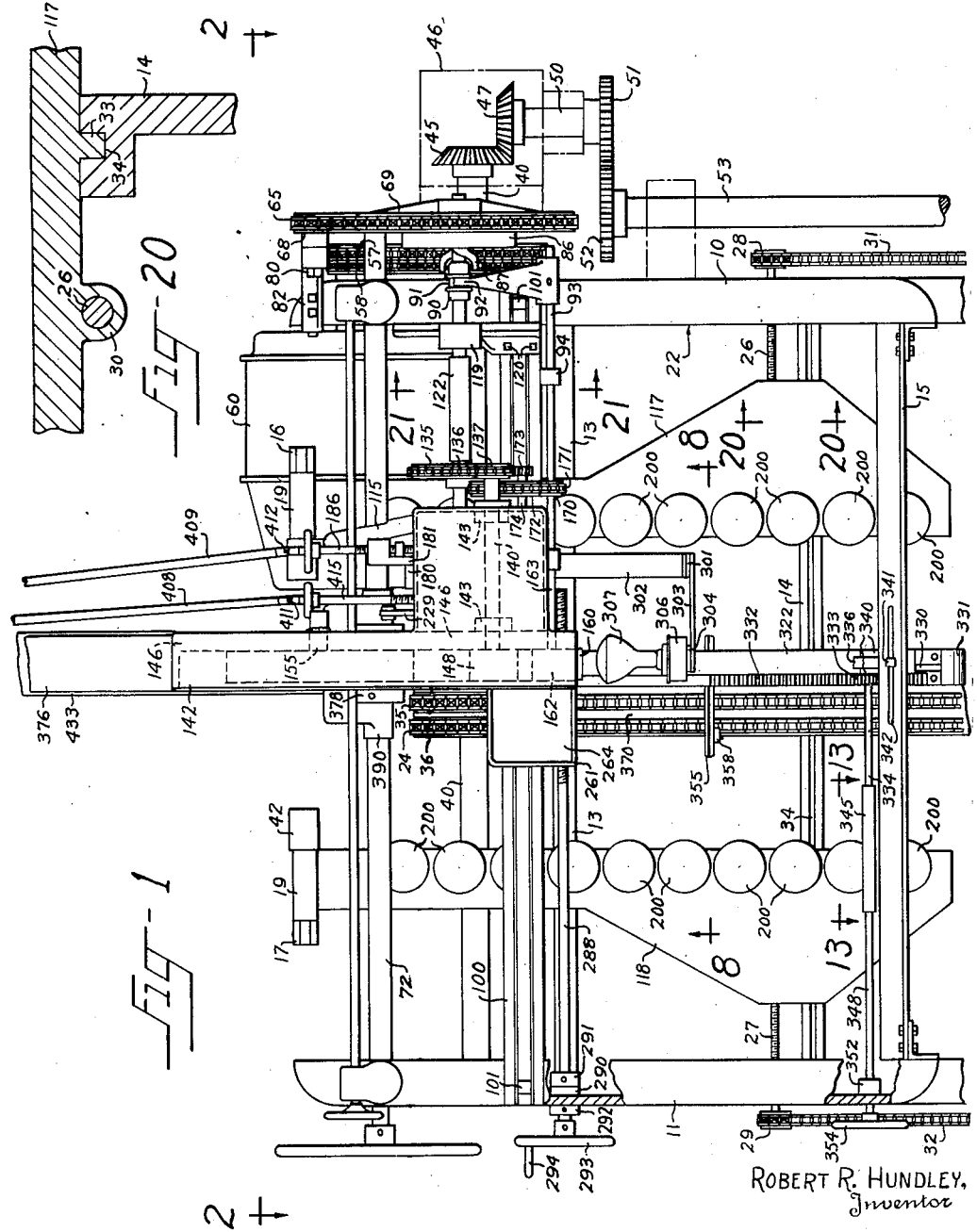

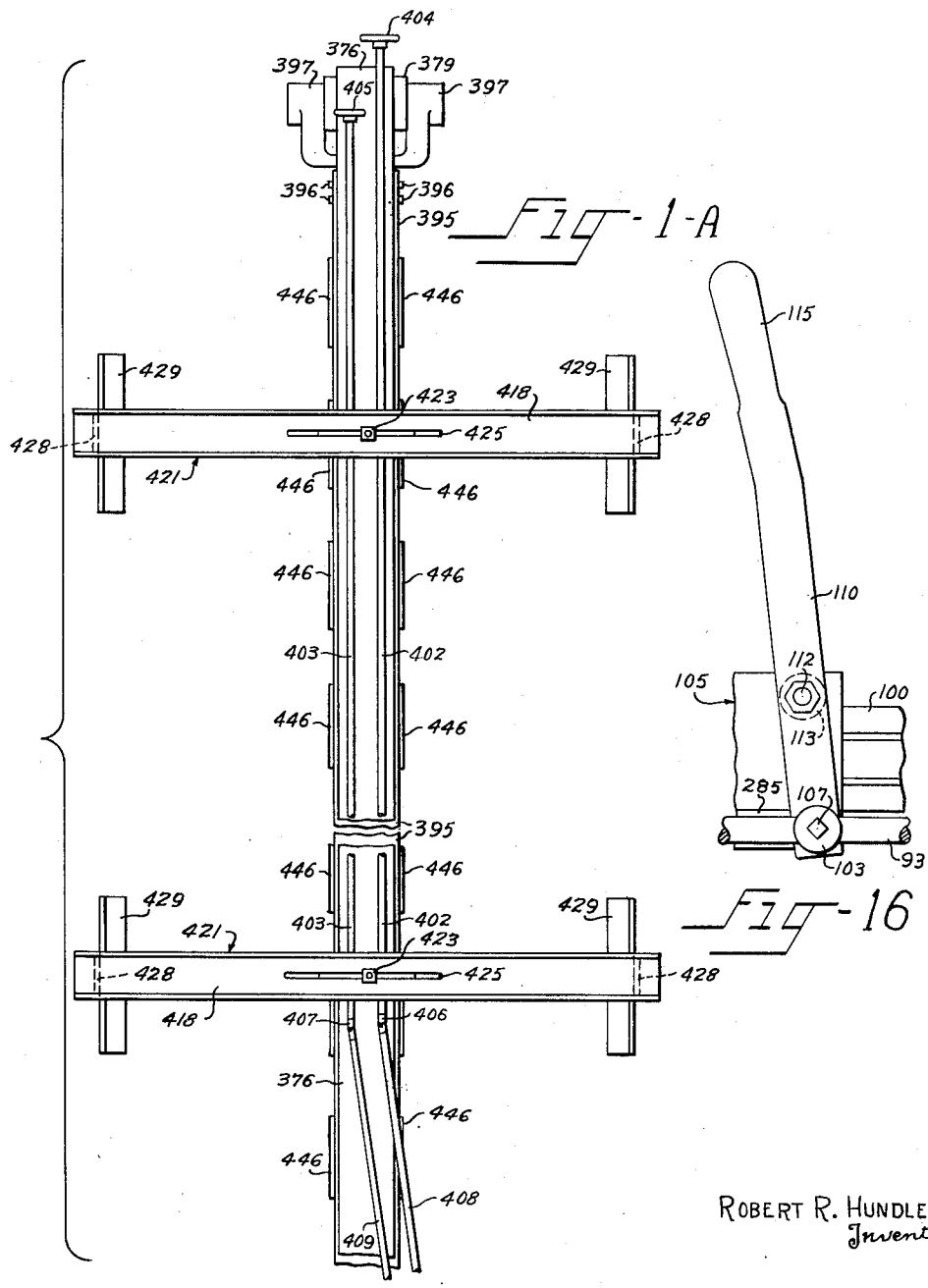

ROBERT R. HUNDLEY,
Inventor

By

Attorney

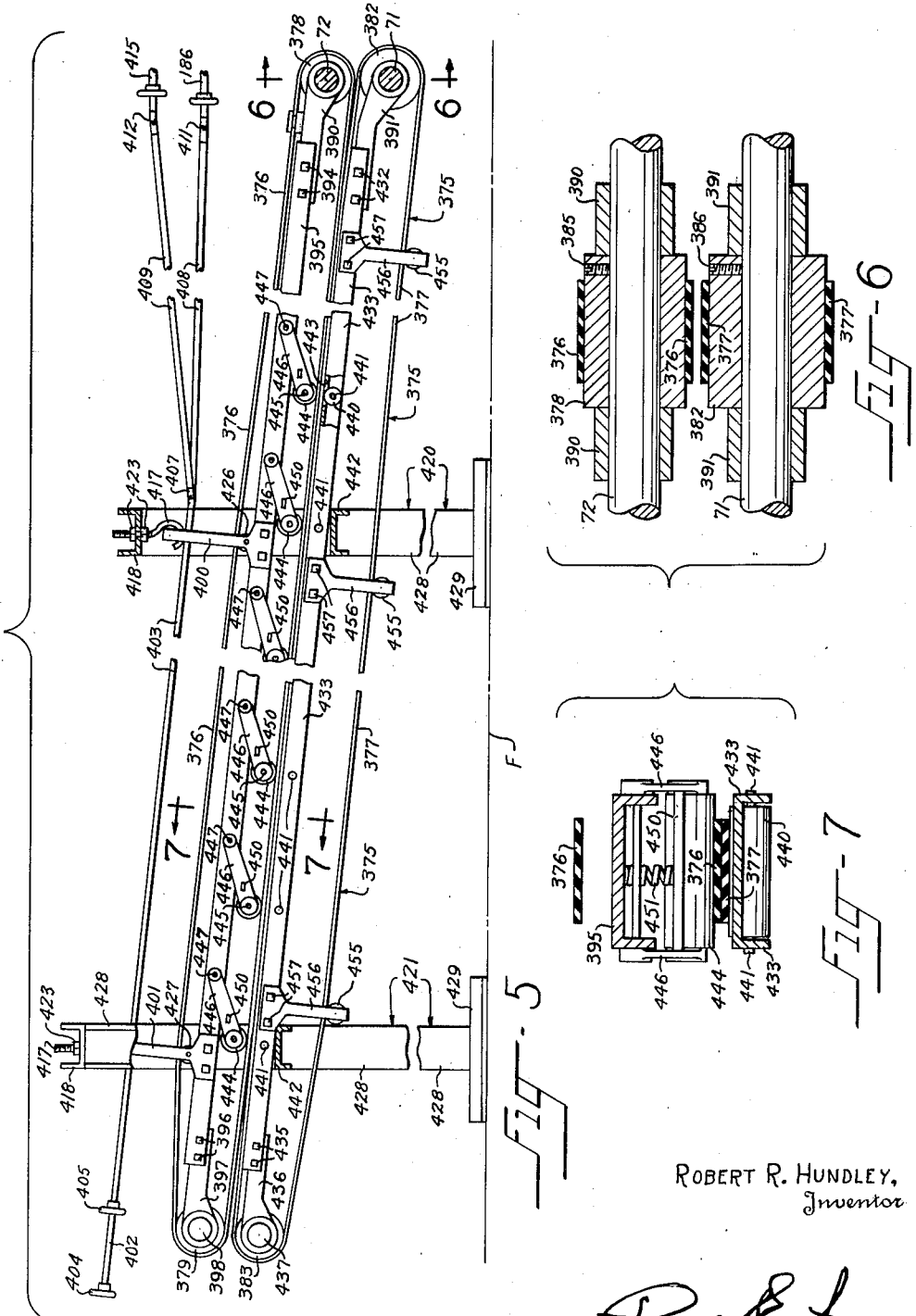

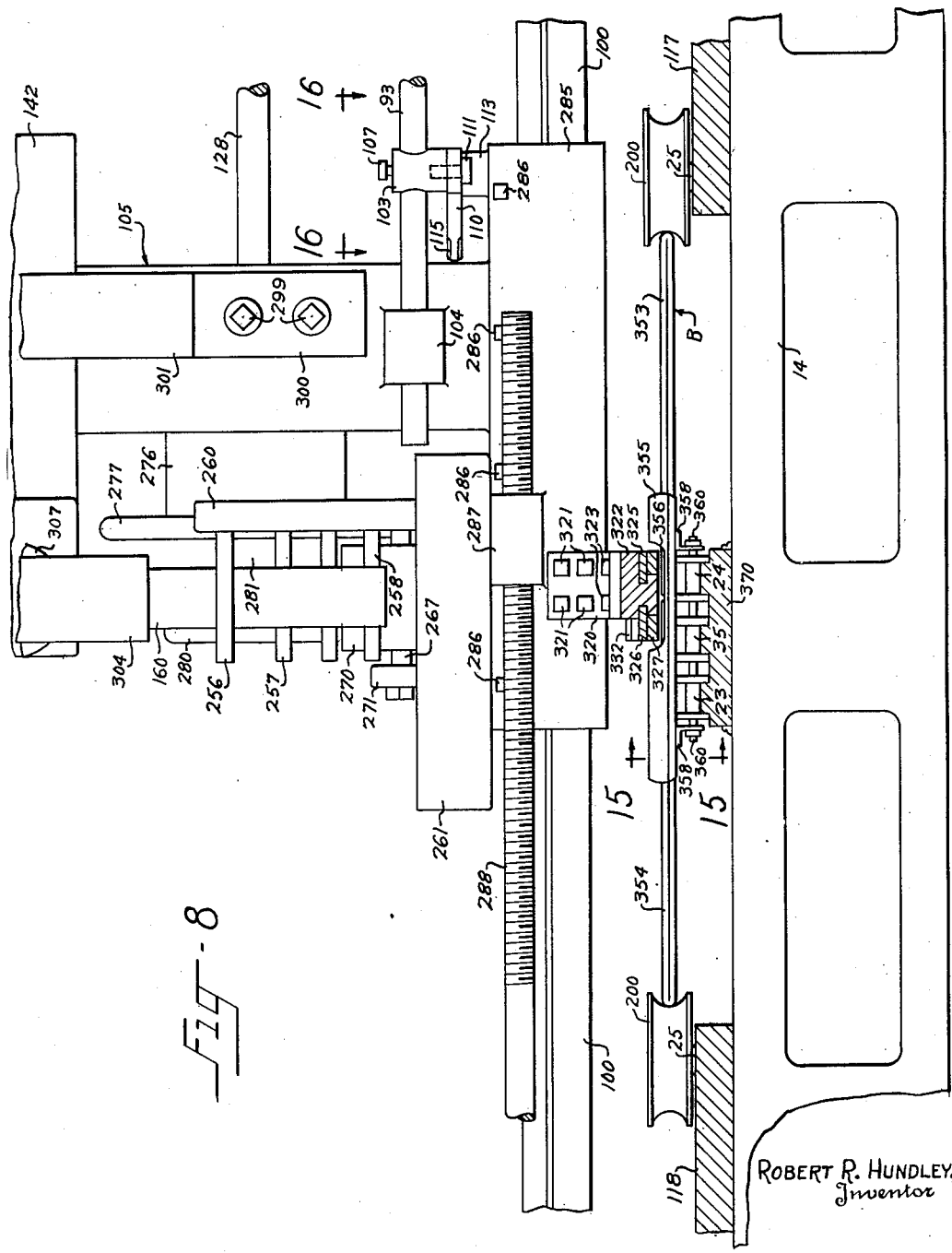

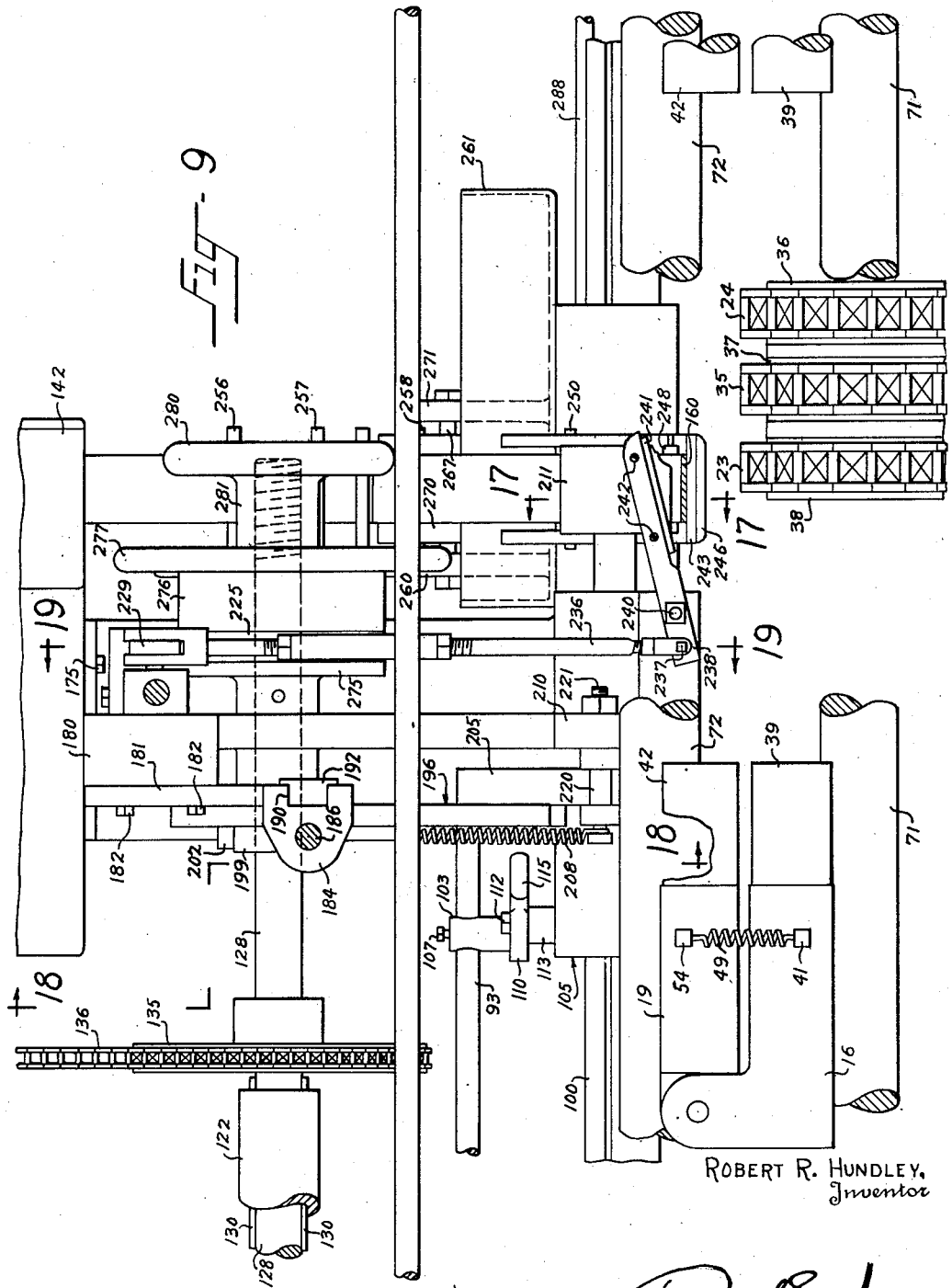

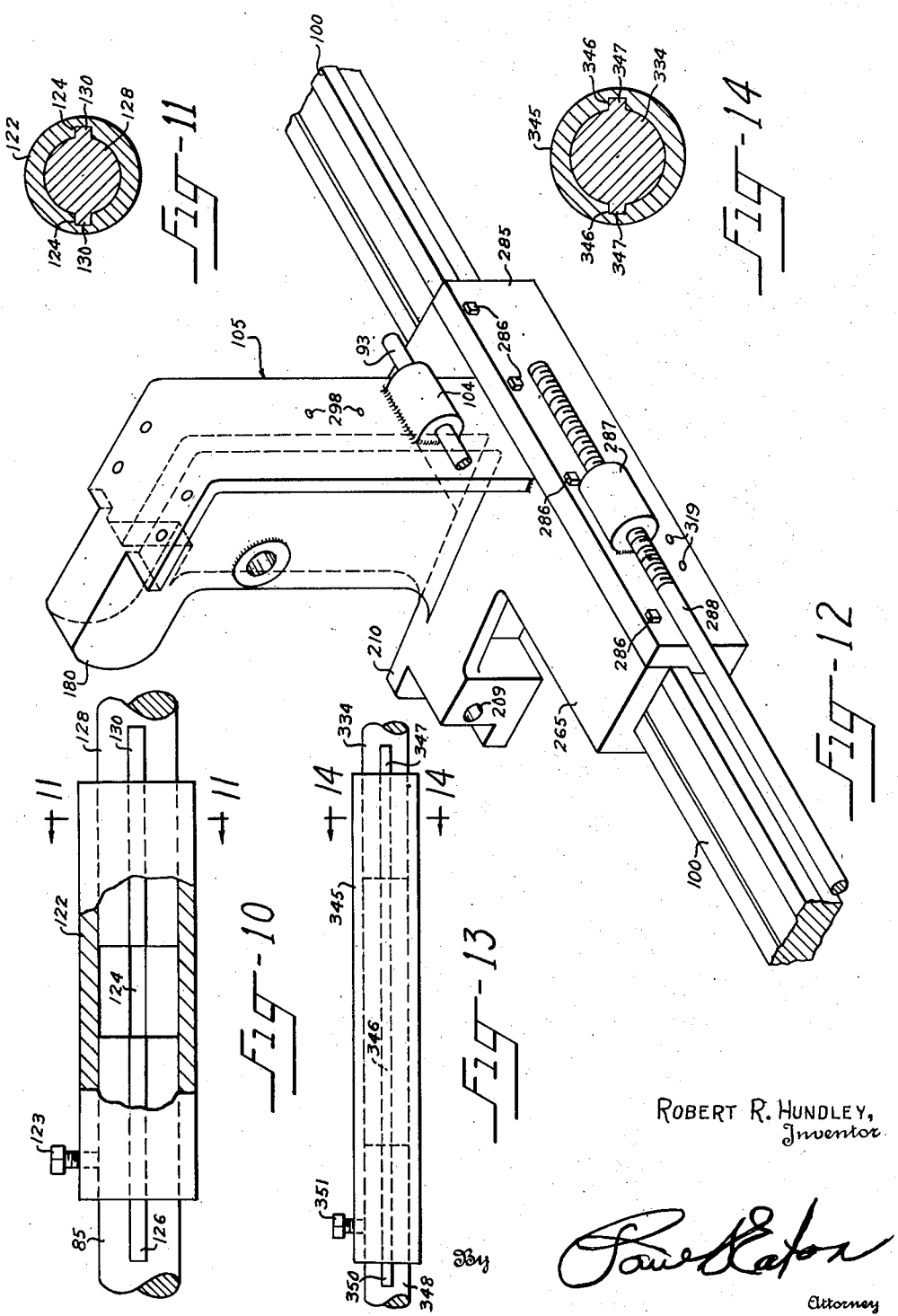

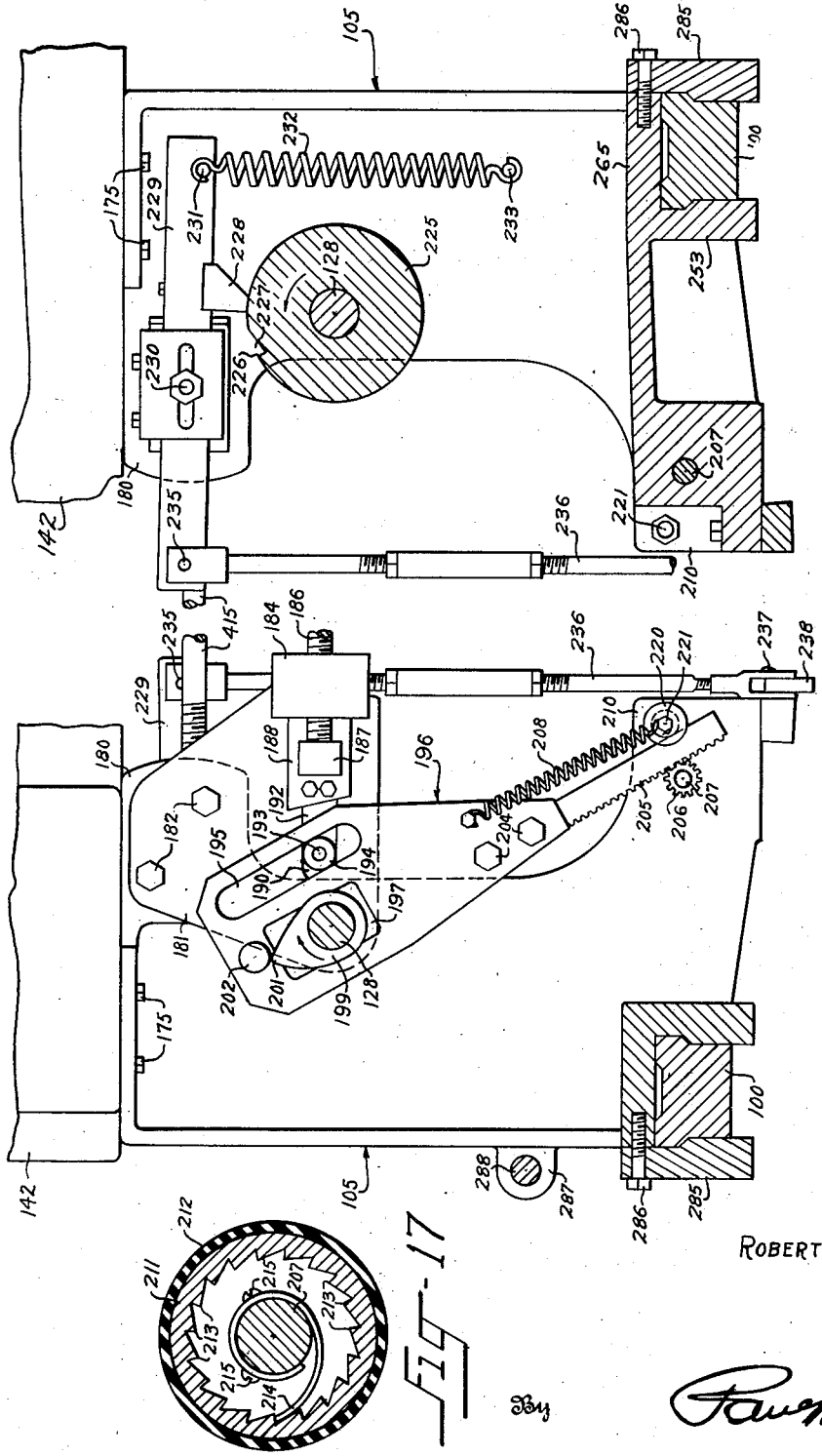

Patented July 4, 1950

2,513,647

UNITED STATES PATENT OFFICE 2,513,647

TAPING MEANS FOR CARTON FOLDERS

Robert R. Hundley, Charlotte, N. C., assignor to Old Dominion Box Company, Lynchburg, Va., a corporation of Virginia Application June 28, 1948, Serial No. 35,709

2 Claims. (Cl. 93—56)

This invention relates to improvements in folding machines and more especially to improvements in a machine of the type shown in United States Letters Patent No. 2,336,507 issued to Albert F. Shields, on December 14, 1943.

In the conventional folding machine, large-sized box blanks of, for instance, corrugated board are placed on the bed of the machine and as they are fed into the machine they are folded so that portions of the blanks are folded from both ends of the blank inwardly to where the opposed ends of the blank will meet each other and the folded blanks are then fed into a taping mechanism which applies an adhesive strip along the meeting folded edges in order to create a rectangular tube after the blank has been removed from the machine. In the present machines, various adjustments can be made in the component parts of the machine to permit various sizes of blanks as well as various sizes of the portions to be folded on said blanks being fed through the machine. However, in the present structure due to the variations in the location of the meeting points of the folded portions of the blank, it is not possible in many cases to properly aline this meeting point with the tape applying means.

It is therefore an object of this invention to provide a tape applying means in combination with the folding machine which may be adjusted transversely of the machine so as to aline the tape within the tape applying means properly with the meeting point of the opposed edges of a blank after it has been folded.

It is another object of this invention to provide heating means for applying heat to the surface of the tape, after having been previously treated with a dried adhesive material, so that when moisture is applied to the surface of the tape, the tape will be more adhesive than it would be if no heat had been applied thereto.

It is another object of this invention to provide a conveyor which may be adjusted transversely of the machine so that the conveyor will be in alinement with the meeting points of the folded portion of the blanks after they have been fed through the taping mechanism.

Some of the objects having been stated others will appear as the description proceeds when taken in connection with the accompanying drawings in which Figure 1 is a plan view showing the discharge end of the folding machine and showing the feed end of a conveyor associated therewith as well as the improvements made in the machine;

Figure 1A is an extension of Figure 1 showing the discharge end of the conveyor associated with the machine;

Figure 2 is an end elevation, partly in section showing the discharge end of the machine and being taken substantially along the line 2—2 in Figure 1;

Figure 3 is a side elevation of the discharge end of the machine and looking from left to right in Figure 2, or from right to left in Figure 1;

Figure 5 is a side elevation of the discharge conveyor associated with the machine looking from left to right in Figures 1 and 1A;

Figure 6 is a vertical sectional view taken along the line 6—6 in Figure 5;

Figure 7 is a vertical sectional view taken along the line 7—7 in Figure 5;

Figure 8 is an elevation, with parts in section, and with parts omitted and taken along the line 8—8 in Figure 1;

Figure 9 is an enlarged view of the central portion of Figure 2 with parts broken away;

Figure 10 is a top plan view of one of the shafts, taken substantially along the line 10—10 in Figure 2 with parts broken away;

Figure 11 is a vertical sectional view taken along the line 11—11 in Figure 10;

Figure 12 is an isometric view of the main supporting member of the taping mechanism showing how it is mounted;

Figure 13 is an elevation of a shaft taken along the line 13—13 in Figure 1 with parts broken away;

Figure 14 is a vertical sectional view taken along the line 14—14 in Figure 13;

Figure 15 is a vertical sectional view taken along the line 15—15 in Figure 8 showing the means for conveying the blanks to the machine;

Figure 16 is a plan view of a shifting lever and is taken substantially along the line 16—16 in Figure 8;

Figure 17 is a vertical sectional view through a tape feeding roller, taken substantially along the line 17—17 in Figure 9;

Figure 18 is a vertical sectional view taken substantially along the line 18—18 in Figure 9;

Figure 19 is a vertical sectional view taken along the line 19—19 in Figure 9 with various parts omitted.

Figure 20 is a vertical sectional view taken along the line 20—20 in Figure 1;

Figure 21 is an elevation with parts in section and taken substantially along the line 21—21 in Figure 1.

Figure 4:
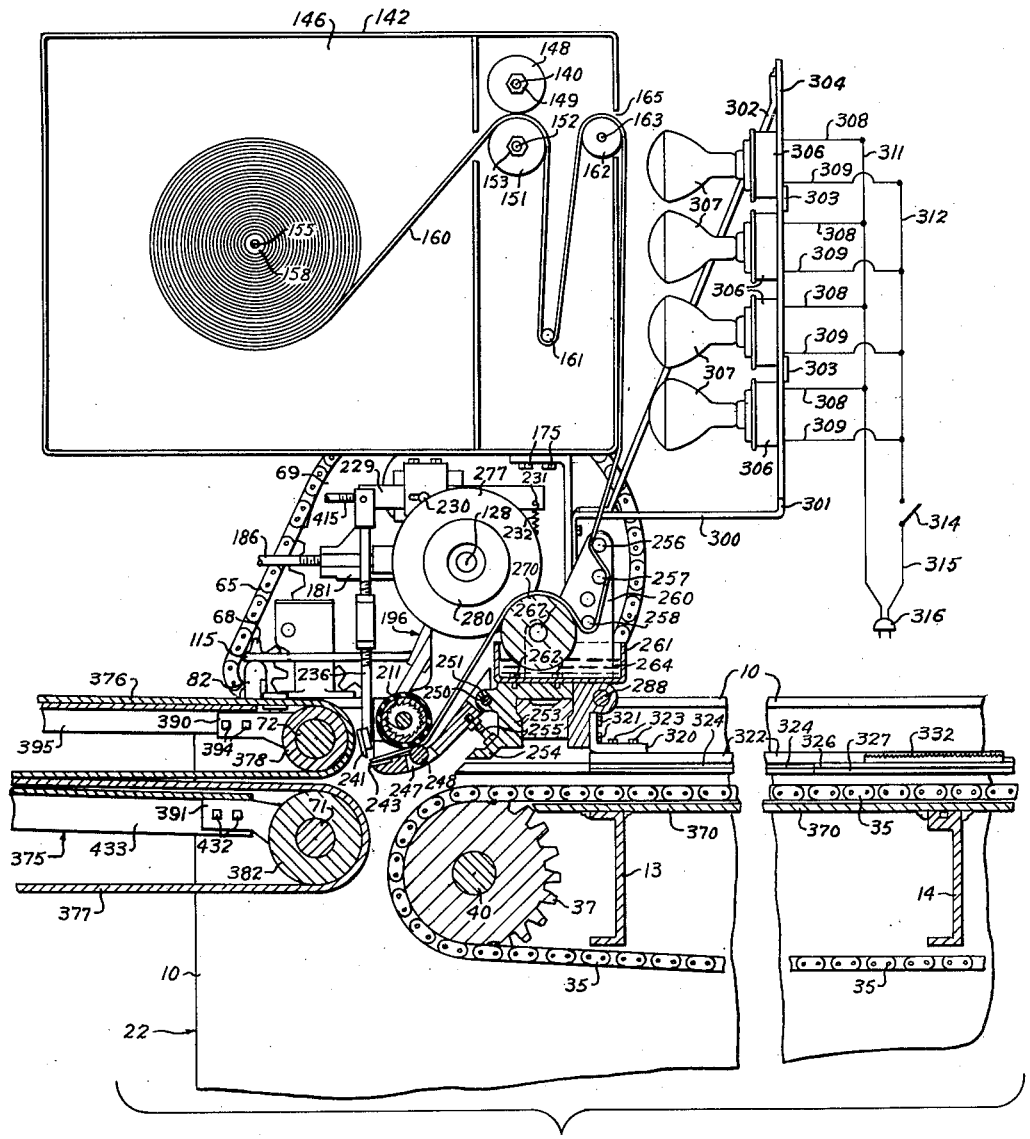
Figure 4 is a vertical sectional view taken substantially along the line 4—4 in Figure 2.

Referring more specifically to the drawings the numeral 22 broadly designates the framework of the machine. This framework 22 is called a bed 22 in said patent. The frame 22 comprises side frame members 10 and 11 which are connected at their lower ends by a transverse angle bar 12 and intermediate their upper and lower ends by transverse channel bars 13 and 14 and by an upper transverse angle bar 15 all of which are secured to or are integral with the vertical side frame members 10 and 11.

Mounted for horizontal sliding movement on the upper flanges of the channel bars 13 and 14 are spaced plates 117 and 118 which extend longitudinally of the machine and have fixedly mounted thereon a plurality of studs 25 which extend upwardly from the same and have rotatably mounted thereon grooved rollers 200 which are the same as those shown in Figure 13 of said patent. The plates 117 and 118 each have a boss 30 which is threadably penetrated by threaded shafts 26 and 27 respectively which are rotatably mounted in the vertical side frame members 10 and 11, respectively.

Welded to the discharge ends of the spaced plates 117 and 118 are L-shaped blocks 16 and 17, respectively. These blocks 16 and 17 have, pivotally mounted therein, parallel blocks 19. The blocks 16 and 17 have, rotatably mounted on the proximate ends thereof, rollers 39, and the parallel blocks 19 have, rotatably mounted, on the proximate ends thereof, rollers 42. The rollers 39 and 42 are disposed above each other so that each edge of the blanks B will pass between them as they are discharged from the tape mechanism. The upper rollers 42 are urged downwardly towards the rollers 39 by tension springs 49, the upper ends of which are mounted on spring perches 54, secured on the parallel blocks 19. The lower ends of the springs 49 are mounted in spring perches 41, secured to the L-shaped blocks 16 and 17.

The shafts 26 and 27 have secured on their outer ends sprocket wheels 28 and 29, respectively, which are engaged by sprocket chains 31 and 32, respectively, which extend to a conventional driving mechanism, not shown. This driving mechanism is usually an electric motor which is energized to rotate the shafts 26 and 27 the desired amount for a particular set-up. The plates 117 and 118 have downwardly projecting and transversely disposed ribs 33 which are adapted to slidably engage a groove 34 in the transverse channel member 14 (Figures 1 and 20).

By referring to Figure 3 of said patent there may be observed a shaft 36 which is mounted in the bed 22 of the machine, and this shaft 36 has secured thereto a pair of sprocket wheels 37 and 38 on which are mounted sprocket chains 23 and 24, respectively. There is shown in Figure 2 of my invention a pair of sprocket chains 23 and 24 which are identical to the sprocket chains shown in the said patent and I mount between these chains 23 and 24 a sprocket chain 35. The sprocket chains 23, 35 and 24 are mounted on sprocket wheels 36, 37 and 38, respectively, which are fixedly mounted on a shaft 40. It will be noted in Figures 2 and 9 that the sprocket wheels 36, 37 and 38 are integral with each other.

The shaft 40 is disposed transversely of the machine at its discharge end and is rotatably mounted in the vertical side frame members 10 and 11 and extends through the vertical side frame member 10 and has fixedly mounted thereon sprocket wheels 43 and 44 (Figures 1, 2 and 3) and the shaft 40 extends outwardly beyond the sprocket wheel 44 and has fixedly mounted on the end thereof a bevel gear 45.

The bevel gear 45 is shown in Figures 1, 2 and 3 as being disposed within a gear box 46 which, for purposes of clarity, is shown in dotted lines inasmuch as it is a conventional part of the folding machine. Meshing with the bevel gear 45 is a bevel gear 47 which is fixedly mounted on a shaft 50 which is rotatably mounted in the gear box 46 and extends to the left in Figure 3 and has mounted on the end thereof a pinion 51 which meshes with a pinion 52 fixedly secured on the end of a shaft 53 which extends downwardly in Figure 1, or to the left in Figure 3 and is connected to the folding means which is not pertinent to this invention and is therefore not shown.

As heretofore stated the sprocket wheel 43 is disposed outside of the vertical side frame member 10 and is secured on the shaft 40. The sprocket wheel 43 has mounted thereon a sprocket chain 57 which extends downwardly in Figure 3 and is mounted on a sprocket wheel 58 which, as may be observed in Figure 2, is fixedly mounted on the end of a shaft 59 which extends from an electric motor 60 having electric wires 61 and 62 leading therefrom to a suitable source of electrical energy. Thus the motor 60 imparts rotation to the shaft 59 and the sprocket wheel 58 which, in turn, imparts rotation to the shaft 40.

The sprocket wheel 44 adjacent the sprocket wheel 43 on the shaft 40 has mounted thereon a sprocket chain 65 which, as may be observed in Figure 3, is also mounted on sprocket wheels 66, 67, 68 and 69. The sprocket wheel 66 is fixedly mounted on the end of a shaft 71 which is rotatably mounted in the vertical side frame member 10 and extends therethrough and is rotatably mounted in the side frame member 11 at its other end (Figure 2).

The sprocket wheel 67 is disposed directly above and in spaced relation to the sprocket wheel 66 and is fixedly mounted on the end of a shaft 72 which is also rotatably mounted in vertical side frame member 10 and extends therethrough and is rotatably mounted in the vertical side frame member 11 at its other end. The sprocket wheel 68 serves as an idler and is rotatably mounted on a stud 80 which is secured in a bracket 82 secured to the top surface of the vertical side frame member 10 (Figures 1, 2 and 3).

The sprocket wheel 69 is rotatably mounted on a shaft 85 and has drum portion 86 integral therewith. The interior surface of the drum portion 86 is engaged by a clutch mechanism, not shown, having clutch arms 87 extending therefrom (Figures 1 and 2) which, when the clutch is in engagement with the drum portion 86, are engaged at their proximate ends by the collar sleeve 90 which is keyed to the shaft 85 and has horizontal sliding movement thereon. This sleeve 90 is grooved as at 91 and said groove is engaged by a fork member 92 which extends downwardly in Figure 1 and is fixedly secured on the end of a shipper shaft 93.

The shipper shaft 93 is mounted for horizontal sliding movement in a bearing block 94 (Figure 1) which extends downwardly from the shaft 93 and is secured by any suitable means such as screws 95 to a dovetailed guide bar 100 which is disposed transversely of the machine and is secured at each end thereof to the vertical side frame members 10 and 11 by any suitable means such as screws 101.

The shaft 93 extends towards the center of the machine and penetrates a block 103 and is slidably mounted at its free end in a boss 104 which is integral with the tape mechanism frame broadly designated at 105, to be presently described. The block 103 is secured on the shaft 93 by a set screw 107, and the block 103 extends downwardly and engages one end of a horizontally disposed lever bar 110 (Figures 8, 9, and 16) and is mounted on the end of the lever bar 110 by a shoulder screw 111 (Figure 8). The lever bar 110 extends towards the discharge end of the machine and is oscillatably mounted at 112 on an upwardly projecting portion 113 which projects upwardly from the tape mechanism frame 105. The lever 110 has a handle portion 115 integral therewith.

All parts heretofore described with the exception of the dovetailed bar 100, are conventional parts of the folding machine. The top part of the tape applying mechanism is conventional, but the lower portion has various novel improvements made in the same and it is more especially desired to bring out the use of a slidable tape applying mechanism to be mounted on the dovetailed bar 100.

The shaft 85 (Figure 2) on which the clutch actuating collar 90 is slidably mounted, is rotatably mounted in a bearing block 119 which extends downwardly from the shaft 85 and is secured by any suitable means such as screws 120 (Figures 1 and 21) to the top surface of the dovetailed bar 100 and at the left-hand end thereof is secured to the vertical side frame member 10, by any suitable means such as screws 121, as observed in Figure 21. The shaft 85 extends through the bearing block 119 and has fixedly mounted thereon a sleeve 122 by any suitable means such as a set screw 123 (Figure 10).

The sleeve 122 has grooves 124 extending longitudinally thereof which are engaged by projecting ribs 126 disposed longitudinally of the shaft 85 and at opposite sides of the shaft 85. The sleeve 122 extends to the right as observed in Figures 2 and 10 and has mounted therein for horizontal sliding movement, one end of a shaft 128 having keys 130 integral therewith which engage the slots 124 in the opposed internal surfaces of the sleeve 122.

The sleeve 122 will thereby permit lateral adjustment of the shaft 128 in the sleeve 122 for purposes to be later described. The shaft 128 extends out of the sleeve 122 and has fixedly mounted thereon a sprocket wheel 135, having a sprocket chain 136 mounted thereon and extending upwardly from the same (Figures 2, 3 and 9).

The upper end of the endless sprocket chain 136 is mounted on the sprocket wheel 137 (Figures 2 and 3) which is fixedly mounted on a shaft 140 which is rotatably mounted in a box-like housing 142 (Figure 1) having bearing blocks 143 therein. The box-like member 142 has a heavy partition 146 therein which extends rearwardly in the box-like member 142 towards the discharge end of the machine.

The shaft 140 extends through the partition 146 of the box-like member 142 and has mounted on the end thereof a roller 148 which is secured on the end of the shaft 140 by a nut 149 (Figure 4). Disposed below the roller 148 and on the same vertical frame is the roller 151 which is rotatably mounted on a stub shaft 152 and confined thereon by a nut 153 (Figure 4). The stub shaft 152 of the idler roller 151 is fixedly mounted in the partition 146.

A shaft 155 fixedly mounted in the box-like housing 142 extends through the partition 146 and has rotatably mounted on the end thereof a roller 158 which has wound therearound suitable tape 160 which has been chemically treated with a dry adhesive. The tape 160 passes between the driven roller 148 and the idler roller 151 and extends downwardly to a pin 161 which is fixedly secured in the vertically disposed partition 146. The tape then extends upwardly to and is mounted on a roller 162 which is fixedly mounted on a shaft 163 (Figures 1 and 4) and the tape 160 then passes out of the box-like member 142 through an opening 165.

The shaft 163 on which the roller 162 is fixedly mounted extends through the wall 146 and extends towards the right-hand end the machine as observed in Figure 1 and has mounted thereon a sprocket wheel 170 (Figure 3). The sprocket wheel 170 has a sprocket chain 171 mounted thereon which extends downwardly and to the right in Figure 3 and is mounted on a sprocket wheel 172 having a smaller sprocket wheel 173 integral therewith and both sprocket wheels 172 and 173 are rotatably mounted on a stub shaft 174, said stub shaft being fixedly secured in the box-like member 142. The sprocket wheel 173 is engaged by the sprocket chain 136 to thus have rotation imparted to the same and in turn impart rotation to the sprocket wheel 172 and thus to the sprocket wheel 170 mounted on the shaft 163. The box-like member 142 is secured by any suitable means such as screws 175 (Figures 4 and 9) to the top surface of the tape mechanism frame 105.

By referring to Figures 9 and 12 it may be observed that the frame member 105 has an outwardly projecting portion 180 integral therewith on the vertical side surface of which a plate member 181 is secured by any suitable means such as screws 182. This plate member 181 has integral therewith, and disposed towards the discharge end of the machine, a boss 184 which is threadably penetrated by a horizontally disposed threaded shaft 186 which extends to the left as observed in Figure 18 and has an enlarged portion, not shown, rotatably mounted in a portion 187 of a sliding member 188. This portion 187 also confines the end of the shaft 186 therein by means, not shown, so that the shaft 186 may be moved to the right or to the left as observed in Figure 18 and thus cause the slide 188 to be moved to the right or to the left.

The plate 181 is slotted as at 190 (Figures 9 and 18) and the slide member 188 has integral therewith a smaller slide member 192 which has horizontal sliding movement in the slot 190. This sliding member 192 has a stub shaft 193 projecting therefrom on which is rotatably mounted a roller 194.

The roller 194 penetrates a slot 195 in a plate broadly designated at 196. The plate 196 also has an opening 197 therethrough, through which the shaft 128 passes. The shaft 128 has fixedly mounted thereon a cam wheel 199 which is disposed adjacent the plate 196 (Figures 9 and 18) and this cam wheel 199 has a raised lobe 201 which is adapted to engage a pin 202 fixedly mounted in the vertical face of the plate 196. It is thus seen that by rotation of the shaft 128 the lobe 201 of the cam wheel 199 will intermittently engage the pin 202, projecting from the plate 196, and will thus urge the plate upwardly against the pull of a tension spring 208, and the plate will be guided by the roller 194 in the slot 195. The threaded shaft 186 is used for adjusting the roller 194 to the right or to the left as observed in Figure 18 to thereby move the pin 202 relative to the shaft 128. This will of course decrease or increase the angular movement of the plate 196 by the cam wheel 199.

The lower end of the plate 196 (Figure 18) has fixedly secured thereto, by any suitable means such as screws 204, a rack 205 which is adapted to engage a pinion 206 which is integral with a transverse tape feeding shaft 207 (Figures 9 and 17) which in turn is rotatably mounted in the tape mechanism frame 105. The shaft 207 slidably penetrates a hole 209 in a lower projecting portion 210 of the frame member 105 and has rotatably mounted on one end thereof a roller 211 having a resilient rubber covering 212.

The roller 211 is hollow and has internal ratchet teeth 213 therein which are adapted to be engaged by a torsion spring dog member 214 which has one of its ends fixedly mounted on the end of the shaft 207 by any suitable means such as screws 215 (Figure 17). The purpose of the ratchet mechanism, which is a form of over-riding clutch, is to permit the rack 205 to move downwardly while imparting rotation, in a counter-clockwise direction, to the shaft 207, in Figure 17, without turning the roller 211. On the other hand, upon each upward stroke of the rack 205, in Figure 17, the shaft 207 will transmit a step in rotation to the roller 211 in a clockwise direction in Figures 4 and 17.

Referring again to Figure 18, it may be observed that the rack 205 is held in engagement with the pinion 206 by a peripherally grooved sleeve 220 which is penetrated by a bolt 221 which also penetrates the outwardly projecting portion 210 of the frame 105 and thus secures the grooved sleeve 220 thereto.

The shaft 128 extends through the frame member 105, as heretofore described, and has fixedly mounted thereon a cam wheel 225 having a radially disposed shoulder 226 on its outer surface forming one wall of a cavity 227. This cam wheel 225 (Figures 9 and 19) is engaged by a block member 228 which is integral with a lever bar 229 which is pivoted as at 230 to the vertically disposed tape mechanism frame member 105. The right-hand end of the lever bar 229 (Figure 19) has secured thereto as at 231 a downwardly projecting tension spring 232 which is secured at its lower end as at 233 to the vertically disposed tape mechanism frame member 105.

It is thus seen that the horizontally disposed lever bar 229 is urged downwardly at its right-hand end in Figure 19 to thus cause the block 228 to be held in constant engagement with the peripheral surface of the cam member 225. It is obvious that as the block 228 falls into the cavity 227 of the cam 225 the right-hand end of the lever 229 (Figure 19) will be urged downwardly and the left-hand end of the same will be raised upwardly.

The lever bar 229 has pivotally secured to the left hand end thereof, as at 235, a vertically adjustable connecting rod 236 the lower end of which is pivotally connected as at 237 (Figure 9) to a horizontally disposed lever bar 238 which is pivotally mounted as at 240 on the vertically disposed frame member 105 and has secured on the end thereof a cutter blade 241, by any suitable means such as screws 242. When the blade 241 is moved downwardly from the position shown in Figure 9, it will engage a mating blade 243 (Figures 4 and 9) which is integral with a cast member 246 having a slot 247 therethrough in which a roller 248 is disposed, said roller being rotatably mounted in each side of the cast member 246 as observed in Figure 9.

The cast member 246 is forked at its other end and is oscillatably mounted on a shaft 250 which is fixedly mounted on an outwardly projecting portion 251 of the cast frame member 105. The cast frame member 105 has a downwardly projecting dovetailed portion 253 which has an outwardly projecting portion 254 (Figure 4) which has engaging the upper surface thereof an adjustment screw 255. This adjustment screw 255 is to adjust the relative position of the roller 248 to the roller 211 having the rubber covering 212 thereon to thus cause rotation of the roller 211 to move the paper tape 160 towards the cutting blades 241 and 243.

The tape 160 passes over the roller 162 as heretofore stated and extends downwardly adjacent the right-hand vertical surface of the box-like portion 142 as observed in Figure 4 and successively engages pins 256, 257 and 258 which are fixedly mounted in the vertically disposed bracket 260 which extends downwardly into a water reservoir 261 and is welded to the bottom of the same. The water reservoir 261 is secured by any suitable means such as screws 262, to an outwardly projecting horizontally disposed portion 265 of the frame member 105.

Also fixedly mounted at one end in the bracket 260 is a shaft 267 (Figures 4, 8 and 9) which has rotatably mounted thereon a roller 270 and the other end of the shaft 267 is fixedly mounted in another vertically disposed bracket 271 (Figures 8 and 9) which is also welded to the bottom of the reservoir 261.

The reservoir 261 has a suitable liquid such as water 264 therein in which the roller 270 is partially submerged and as the roller 270 is caused to rotate through contact with the tape 160, some of the liquid will adhere to the outer peripheral surface of the roller 270 and thus will be transmitted to the lower surface of the tape 160 as it passes over the roller 270.

So that the cam wheel 225 may be adjusted around the shaft 128, there is disposed between the cam wheel 225 and the vertically disposed tape mechanism frame member 105 a plate 275 (Figure 9) which is fixedly mounted on the shaft 128. The opposite face of the cam member 225 is integral with a drum portion 276 having a hand wheel 277 integral therewith (Figure 9). The cam wheel 225, the drum member 276 and the hand wheel 277 being integral are all rotatably mounted on the shaft 128 and by turning the hand wheel 277 the position of the shoulder 226 of the cam wheel 225 may be adjusted relative to the shaft 128. However, before the hand wheel 277 may be turned a hand wheel 280 must be turned inasmuch as the hub 281 of the hand wheel 280 engages the right-hand surface of the hand wheel 277 as observed in Figure 9. This hand wheel 280 is threadably mounted on the end of the shaft 128. Thus, by turning the hand wheel 280 relative to the shaft 128 the hub portion 281 of the hand wheel 280 will be moved away from the hand wheel 277 and thus allow the cam wheel 225 to be adjusted relative to the shaft 128.

Fixedly mounted on the intake edge of the tape mechanism frame member 105 is a downwardly projecting dovetailed member 285 (Figures 4, 12, 18 and 19), which is similar to the downwardly projecting portion 253, and is disposed in spaced relation thereto so that the tape mechanism frame member 105 may be guided by the dovetailed bar 100. This plate 285 is secured to the lower edge of the tape mechanism frame 105 by any suitable means such as screws 286 and has integral therewith a boss 287 which is threadably penetrated by a shaft 288 (Figure 12).

By referring to Figure 1 it may be observed that the shaft 288 extends from the tape mechanism frame member 105 to the left and is rotatably mounted in a bearing portion 290 of the vertically disposed side frame member 11. The shaft 288 has fixedly mounted thereon collars 291 and 292 which are disposed to each side of the bearing portion 290 to thus prevent endwise movement of the shaft 288. The shaft 288 has mounted on the outer end thereof a hand wheel 293 having a handle 294 integral therewith which may be grasped by an operator for turning the shaft 288. By turning the shaft 288 the relative position of the tape mechanism frame member 105 may be adjusted relative to the vertically disposed side frame members 10 and 11. That vertical surface of the tape mechanism frame member 105 which is nearest the intake end of the machine has mounted thereon, by any suitable means such as screws 299 threaded into holes 298, a bracket 300 (Figures 4 and 8) which extends towards the feed end of the machine and has an upwardly projecting portion 301 integral therewith which is braced between its upper end and the tape mechanism frame 105 by a diagonally disposed brace member 302 which is secured to the bracket 300, by any suitable means such as welding.

Extending from the vertically disposed portion 301 of the bracket 300 are horizontally disposed spaced strap iron bars 303 which are welded at their other ends to a vertically disposed strap iron member 304 (Figure 4). The vertically disposed strap iron member 304 has mounted thereon, by any suitable means such as welding, a plurality of incandescent bulb receptacles each designated by reference character 306. These bulb receptacles 306 each have threadably mounted therein, in a conventional manner, incandescent bulbs indicated at 307. These bulbs 307 are conventional heat bulbs and are disposed in spaced relation to that portion of the paper tape 160 which extends from the roller 126 (Figure 4) downwardly to where it engages the first horizontally disposed pin 256 heretofore described to thus apply heat to that surface of the tape 160 which has been treated with the dry adhesive to thereby cause the adhesive to be more adhesive after contact with water than it would be if the heat were not applied.

Electrical energy is transmitted to the incandescent light bulbs 307 by branch wires 308 and 309 which extend from lead wires 311 and 312 (Figure 4). The lead wire 311 extends downwardly to one side of a male plug 316 and the wire 312 extends downwardly to one side of a switch 314 and the other side of the switch connected to a lead wire 315 which leads to the other side of the male plug 316, thus by inserting the male plug 316 into a suitable source of electrical energy, not shown, by closing the switch 314 the electrical energy will be transmitted to the incandescent bulbs 307 to thus cause heat from the same to be applied in the manner heretofore described.

Fixedly mounted on that surface of the dovetailed plate 285 which is towards the feed end of the machine is an angle clip 320 which is secured thereto by any suitable means such as screws 321 fitting into threaded holes 319 (Figures 4, 8 and 12). Mounted against the lower surface of the horizontal leg of the angle clip 320 is a bar 322, by any suitable means such as screws 323. By referring to Figure 8 it may be observed that the bar 322 has grooves 324 in each side thereof in which portions 325 and 326 of a bar 327 are mounted for horizontal sliding movement. This bar 327 is similar to the bar 113 of said patent and is provided for the same purpose. This bar 327 has a slot 330 extending longitudinally thereof and is joined together at its end nearest the feed end of the machine by a portion 331.

The portion 326 of the bar 327 has fixedly mounted thereon a rack 332 (Figures 1 and 8) which extends longitudinally thereof and near its end which is nearest the feed end of the machine it engages a pinion 333 (Figure 1) which is fixedly secured on a transverse shaft 334 mounted in a bearing block 336 which is integral with and projects upwardly from the longitudinally disposed bar 322. The shaft 334 has collars 340 mounted thereon at each side of the bearing block 336 to thus prevent endwise movement of the shaft 334. The longitudinally disposed bar 322 is secured, at its end nearest the feed end of the machine, to the lower surface of the transversely disposed angle bar 15, by any suitable means such as a screw 341, which penetrates an adjustment slot 342 in the horizontally disposed angle bar 15.

It may be observed in Figure 1 that the horizontally disposed shaft 334 extends to the left and slidably penetrates one end of a sleeve 345 having key ways 346 therein which are adapted to engage keys 347 of the shaft 334 (Figures 1, 13 and 14). The other end of the sleeve 345 is fixedly engaged by one end of the shaft 348 having keys 350 integral therewith which are also adapted to engage the key ways 346 in the sleeve 345. The sleeve 345 is secured on the end of the shaft 348, by any suitable means such as a set screw 351.

The shaft 348 then extends to the left as observed in Figure 1 and is rotatably mounted in a bearing block 352 integral with the vertically disposed side frame member 11 and the end of the shaft 348 has fixedly mounted thereon a hand wheel 354. By turning the hand wheel 354 to thus transmit rotation to the pinion 333 on the other end of the shaft 334, the pinion, being in engagement with the rack 332 will adjust the bar 327 towards or away from the discharge end as may be desired to accommodate various sized blanks.

By referring to Figure 8 in may be observed that there is disposed between the rollers 200 a blank broadly designated at B having inturned flaps 353 and 354 the proximate edeges of which are to be joined together by the tape 160. These blanks B are fed into the machine in the manner shown in said Patent 2,336,507. As the blanks B are fed into the machine, they are engaged by angle bar 355 having a cutaway portion 356 therein (Figures 8 and 15). Although the cutaway portion 356 is shown in one position in the angle bar 355 in Figure 8, the angle bars 355 may easily be removed and replaced by angle bars having the cutaway portion 356 in a different position so that the bar 322 and associated parts may be adjusted to the right or to the left as observed in Figure 8, as desired. The angle bars 355 have integral therewith and disposed near each end thereof angle clips 358 each of which have a slot 359 which is adapted to be mounted on a transverse shaft 360 extending through the link chains 23, 35 and 24. The slot 359 engages a restricted portion 361 on the shaft 360 and this restricted portion 361 is also engaged by a transversely disposed locking clip 362 having a slot 363 therein which engages the restricted portion 361 of the shaft 360 and is mounted for horizontal sliding movement on a rivet 364 which is secured in the angle clip 358. It is thus seen that the angle bars 355 may be easily removed from the sprocket chains 25, 35 and 24 by merely moving the locking clip 362 to the right as observed in Figure 15 and by raising the angle bars 355 upwardly to move them from engagement with the shaft 360.

It may be observed in Figures 4, 8 and 15 that the sprocket chains 23, 35 and 24 are supported between the sprocket wheels disposed at each end thereof on a plate 370 which is mounted on the transversely disposed channel members 13 and 14 by any suitable means such as welding.

By referring to Figures 1, 1A and 2 to 7, inclusive, there may be observed an endless belt conveyor broadly designated at 375. This conveyor comprises endless conveyor belts 376 and 377 which are disposed one above the other and extend longitudinally from the discharge end of the machine. The belt 376 is mounted at one end on a pulley 378 and at its discharge end on a roller 379. While, on the other hand, the endless belt 377 on the lower portion of the conveyor is mounted on pulley 382 and roller 383 at the feeding end and discharge end, respectively. The pulleys 378 and 382 are mounted on the shafts 71 and 72, respectively, and are secured thereto by any suitable means such as set screws 385 and 386, respectively (Figure 6). Disposed at each end of the pulley 378 and supported by the shaft 72 are bearing blocks 390 in which the shaft 72 has rotational movement. Disposed at each end of the pulley 382 and supported on the shaft 71 are bearing blocks 391 in which the shaft 71 has rotational movement. Thus the shafts 71 and 72 transmit rotation to the pulleys 378 and 382 to thus move the conveyor belts 376 and 377. The bearing blocks 390 are secured, by any suitable means such as screws 394, to a longitudinally extending channel bar 395 which has secured to the discharge end thereof, by any suitable means such as screws 396, a pair of bearing blocks 397 which are disposed each side of the roller 379 and have rotatably mounted therein a shaft 398 on which the roller 379 is fixedly mounted. The channel bar 395 has integral therewith and extending upwardly from each side thereof the vertical legs of the inverted U-shaped members 400 and 401 the upper ends of which are penetrated by shafts 402 and 403 which are rotatably mounted in the U-members 400 and 401. The extreme ends of the shafts 402 and 403, at the discharge end of the machine, have fixedly mounted thereon hand wheels 404 and 405, respectively. The shafts 402 and 403 are connected by universal joints 406 and 407, respectively, to shafts 408 and 409, respectively. These shafts in turn are connected by a universal joint 411 and 412, respectively, to the shaft 186 and to a shaft 415. The shaft 415 is threadably connected as shown in Figure 19 to the pivot point 230 in a conventional manner for adjusting the pivot point 230 on a horizontal plane. The U-shaped members 400 and 401 are also penetrated by a hooked member 417 at each of their upper ends thereof and these hooks 417 penetrate a horizontally disposed channel bar 418 of U-shaped frame members broadly designated at 420 and 421. The hooked members 417 are secured in the horizontally disposed channel members 418, by any suitable means such as nuts 423. The hooked members 417 penetrate transverse slots 425 in the transverse channel bars 418 to thus allow adjustment of the conveyor 375. It is thus seen that the channel bar 395 is suspended from the channel bar 418 by the U-shaped members 400 and 401. The U-shaped members 400 and 401 have rotatably mounted therebetween rollers 426 and 427, respectively, over which the conveyor belt 376 is adapted to pass.

The inverted U-shaped members 420 and 421 have extending downwardly from each end of the channel bars 418 vertically disposed channel bars 428 which are welded to the horizontally disposed channel bars 418 and are welded at their lower ends to horizontally disposed angle bars 429 which are adapted to rest on the floor F.

The bearing blocks 391 which are mounted on the shaft 71, extend towards the discharge end of the conveyor 375 and are secured, by any suitable means such as screws 432 to rearwardly extending channel bar 433. The discharge end of the channel bar 433 has fixedly secured thereto, by any suitable means such as screws 435, bearing blocks 436 which have rotatably mounted therein, a shaft 437. The roller 383 is fixedly mounted on the shaft 437 between the bearing blocks 436. The channel bar 433 is mounted near its discharge end and intermediate its end on transverse channel bars 442 which are welded at each end to the vertically disposed channel bars 428 of the inverted U-shaped frame members 420 and 421.

It may be observed in Figures 5 and 7 that there is disposed between the downturned flanges of the channel bar 433 a plurality of rollers 440 which have shafts 441 extending therethrough and these shafts 441 extend outwardly from each end of the rollers 440 and are rotatably mounted in the downturned flanges of the channel bar 433. The rollers 440 project through the web portion of the channel bar 433 through opening 443. Thus the conveyor belt 377 passes along the upper surface of the channel bar 433 and also passes over and engages the rollers 440. Disposed in superposed relation to the conveyor belt 377 as it passes over the channel bar 433 is the lower portion of the conveyor belt 376. These conveyor belts 377 and 376 pass over the rollers 440 and there is disposed above the lower reach of the belt 376 transverse rollers 444 which are rotatably mounted as at 445 in the lower ends of arms 446 which extend upwardly towards the feed end of the machine and are pivotally mounted as at 447 to the downturned flanges of the channel bar 395. There is one of these arms 446 disposed on each side of the channel bar 395 for each of the rollers 444. These arms 446 are spanned by bars 450 (Figure 7) on the center of which is mounted the lower end of a compression spring 451 which extends upwardly and engages the lower surface of the web portion of the longitudinally extending channel bar 395 to thus urge the rollers 444 downwardly against the upper surface of the lower reach of the conveyor belt 376 so that as the folded and taped blanks pass between the proximate surfaces of the conveyor belts 376 and 377, the pressure of the rollers 444 against the belt 376 will serve to hold the tape 160 against the joint formed by the proximate ends of the flaps 353 and 354 of the blank B while it is passing between the belts 376 and 377 so that by the time it has reached the end of the conveyor 375 there will be no tendency for the tape to come off the blank B.

The lower portion of the conveyor belt 377 is supported by rollers 455 which are rotatably mounted at each end in upwardly projecting brackets 456 which are mounted on each side of the channel bar 433, by any suitable means such as screws 457.

Now, as is often the case, the flaps 353 and 354 of the blank B, as they are fed into the machine, are not of the same length and in most cases this difference in the length of the flaps 353 and 354 will, of course, change the position of the meeting place of the proximate ends of the flaps 353 and 354. Ordinarily, by adjusting the plates 117 and 118 on a horizontal plane relatively to each other, the proximate ends of the flaps 353 and 354 may be caused to move through the machine at approximately the position shown in Figure 8. However, there are many instances where one of the flaps 353 or 354 may be very short or very close to one or the other of the two sets of rollers 200, as observed in Figure 8, and the other flap will be very long so that the meeting place of the two flaps or the proximate ends thereof will be very close to one of the sets of rollers 200 and it will be impossible to adjust the conventional plates 117 and 118 so that the proximate ends of the flaps 353 and 354 would be in the path of the tape applying means. Due to this proximity of the proximate ends of the flaps 353 and 354 to the rollers 200 the dovetailed bar 100 is provided and the frame 105 of the tape dispensing mechanism has sliding movement thereon guided by the dovetailed members 285 and 253. Before the tape mechanism frame 105 may be adjusted, however, the set screw 107 in the block 103 (Figure 8) must be turned so that the shipper shaft 93 may have horizontal sliding movement in the block 103. The screw 341, in Figure 1, must also be loosened so that the bar 322 and associated parts may also be moved crosswise of the machine inasmuch as the bar 322 is integral with the tape mechanism frame 105. The shafts 334 and 128 will have horizontal sliding movement in the sleeves 345 and 122, respectively, by turning the hand wheel 293 the shaft 288 will be rotated and since the shaft 288 is threadably mounted in the outwardly projecting portion 287 of the tape mechanism frame 105, the rotation of the shaft 288 will cause the tape mechanism frame 105 and associated parts to be moved in the desired direction crosswise of the machine. The shafts 128 and 334 will have relative sliding movement in the sleeves 122 and 345, respectively, and, in the event that the sleeves 122 and 345 are not long enough, other sleeves which are longer may replace the sleeves 122 and 345.

The frame member 105 and the longitudinally disposed bar 322 having been moved to the desired position, the set screw 107 in the block 103 is then tightened down against the shaft 93 and the screw 341 is tightened in the bar 322 through the slot 342, and the machine may then be operated in the conventional manner.

However, the conveyor 375 must also be adjusted so that the center of the same is in alinement with the center of the tape 160. In this instance, it is necessary to loosen the set screws 385 and 386 in the pulleys 378 and 382, respectively, then loosen the nuts 423 that secure the hooks 417 to the horizontally disposed channel members 418 and it is then necessary for the operator to slide the bearing blocks 390 along the shaft 72 to the desired location as well as the bearing blocks 391 along the shaft 71 to the desired location. Simultaneously the hook members 417 must be moved along the slots 425 in the horizontally disposed channel members 418 of the inverted U-shaped frame members 420 and 421. The set screws 385 and 386 are then tightened against the shafts 72 and 71, respectively, and the nuts 423 are tightened against the channel bar 418 and then the machine is ready for operation.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a machine for folding the edges of box blanks over upon themselves towards each other to where the side edges of the blank after folding are in close proximity to each other and disposed on top of the main body portion of the blank, said machine having pressure applying means for applying pressure to the proximate edges of the folded portions of the blank, tape feeding means driven by the machine for feeding an adhesive tape and applying it over the proximate edges of the folded blank, a driven shaft for driving the tape feeding means, said driven shaft having a telescopic portion therein to permit the tape feeding means to be moved transversely of the machine, a transversely disposed trackway disposed on the frame of the machine and above the line of travel of the blanks, means for slidably mounting the tape feeding means on said transversely disposed trackway, a shaft having a hand wheel on one end thereof and having its other end threadably penetrating a portion of the carriage so that upon rotation of the hand wheel, the position of the tape feeding means can be adjusted along said trackway to cause the tape feeding means to coincide with the proximate edges of the folded flaps of the box blank, pressure applying means extending forwardly from the tape feeding means to apply pressure to the proximate edges of the folded blank before it passes beneath the tape applying means, transversely disposed means for supporting the end of the pressure applying means remote from the tape feeding means and a second hand driven shaft having a pinion thereon, a rack on the pressure applying means, said pressure applying means being telescopic whereby, upon rotation of the second hand shaft, the overall length of the pressure applying means can be adjusted to cause the leading edge thereof to be properly positioned for the reception of a blank, the second hand shaft having a telescopic portion therein whereby upon lateral adjustment of the tape feeding means and the pressure applying means, the hand driven portion of said second hand driven shaft will remain unchanged, a transversely disposed member for supporting the end of the pressure applying means remote from the tape feeding means having a longitudinally extending slot therein and means penetrating said slot and engaging said pressure applying means for supporting the receiving end of the pressure applying means.

2. In a machine for folding the side edges of a box blank over onto the main body portion to where the proximate edges of the folded portions will be in close proximity to each other, a transversely disposed trackway disposed on the machine above the line of travel of the blanks, tape feeding and applying means disposed on said trackway and comprising a driven shaft for feeding the tape, said shaft having a telescopic connection therein to permit the tape feeding means to be moved along said trackway to different positions, said tape applying means also having tape severing means and a driven shaft for driving the tape severing means, said second driven shaft having a telescopic connection therein to permit the tape applying means to be moved along said trackway, a hand wheel mounted in the machine and having a threaded portion on its end remote from the hand wheel having a threaded connection with the tape applying means for moving the same along the trackway to adjust the tape applying means to any desired position, telescopic pressure applying means carried by the tape applying means extending forwardly of the machine to engage and press the proximate edges of a folded blank together, means extending across the machine for supporting said pressure applying means, said pressure applying means being telescopic to regulate the overall length thereof, a second hand driven shaft having a hand wheel on one end thereof and a pinion on the other end thereof, the pressure applying means having a rack thereon engageable by the pinion on the second driven hand wheel shaft, whereby, upon rotation of the second hand wheel shaft, the overall length of the pressure applying means will be regulated, a telescopic connection in the second hand wheel shaft to permit lateral adjustment of the tape applying means and the pressure applying means, the means extending across the machine for supporting the pressure applying means having a longitudinally extending slot therein and means mounted in said slot and secured to the pressure applying means for supporting the same at its end portion remote from the tape applying means.

ROBERT R. HUNDLEY.

REFERENCES CITED

The following references are of record in the file of this patent:

UNITED STATES PATENTS

| Number | Name | Date |
| --- | --- | --- |
| 1,198,564 | McLaurin | Sept. 19, 1916 |
| 2,029,394 | Sidebotham | Feb. 4, 1936 |